United States Patent
Hwang

(10) Patent No.: US 6,473,043 B1
(45) Date of Patent: Oct. 29, 2002

(54) ANTENNA ASSEMBLY

(75) Inventor: Jenq-Yih Hwang, Irvine, CA (US)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/837,001

(22) Filed: Apr. 17, 2001

(51) Int. Cl.[7] .............................................. H01Q 1/24
(52) U.S. Cl. ............................... 343/702; 343/700 MS; 343/878; 361/683; 361/686
(58) Field of Search ..................... 343/700 MS, 702, 343/878, 793, 795, 830, 872; 312/223.2, 223.3; 361/683, 686, 724, 725, 726, 727

(56) References Cited

U.S. PATENT DOCUMENTS

| | | | |
|---|---|---|---|
| 5,640,301 A | * | 6/1997 | Roecker et al. ............. 361/686 |
| 5,739,791 A | * | 4/1998 | Barefield et al. ............ 343/702 |
| 5,867,131 A | * | 2/1999 | Camp, Jr. et al. ............ 343/797 |
| 5,918,163 A | * | 6/1999 | Rossi .......................... 455/90 |
| 6,181,284 B1 | * | 1/2001 | Madsen et al. ............. 343/702 |

FOREIGN PATENT DOCUMENTS

WO   WO 94/24722   * 10/1994   ............ H01Q/1/24

* cited by examiner

Primary Examiner—Don Wong
Assistant Examiner—Shih-Chao Chen
(74) Attorney, Agent, or Firm—Wei Te Chung

(57) ABSTRACT

An antenna assembly (1) mounted in an enclosure (21) of a computer (2) comprises a bracket (15) adapted to be mounted in the computer enclosure, an antenna unit (10) including a substrate (19) and an antenna body (16) attached on the substrate, an insulative housing (14) attached to the bracket and receiving the antenna unit, and a connector unit (100) including a cable (13) and a connector (12) connected to an end of the cable, the cable having an opposite end passing through the bracket to connect with the antenna unit.

13 Claims, 5 Drawing Sheets

ANTENNA ASSEMBLY

FIELD OF THE INVENTION

The present invention relates to an antenna assembly and particularly to an antenna assembly mounted in an electronic device for wireless telecommunication.

BACKGROUND OF THE INVENTION

Following the development of communication technology, especially the development of Wireless Local Area Network (WLAN), Bluetooth and HomeRF, etc., many electronic devices have the function of wireless telecommunication in close range. To achieve the function, an antenna is used in an electronic device for receiving and transmitting signals. As disclosed in prior arts, an antenna is directly mounted in an electronic device by soldering or screwing. Thus, the antenna is exposed to outside and is easy to be damaged. Another disadvantage of this prior art is that the structure of mounting is immobile, which makes the assembly and the disassembly process inconvenient. This is time-consuming and requires special equipment.

The present invention is directed to solving the above problems and satisfying the need for an antenna assembly to simplify the assembly and protect the antenna effectively.

BRIEF SUMMARY OF THE INVENTION

A primary object, therefore, of the present invention is to provide an antenna assembly which has a simplified structure for simplifying the assembly process of the antenna.

Another object is to provide an antenna assembly to protect the antenna effectively from outer physical damage.

In order to achieve the objects set forth, an antenna assembly in accordance with the present invention comprises a bracket, an antenna unit, an insulative housing and a connector unit. The bracket is mounted to an enclosure of a desktop computer. The antenna unit includes a substrate and an antenna body attached on the substrate. The insulative housing is attached to the bracket and receives the antenna unit. The connector unit includes a cable and a connector connected to an end of the cable, the cable having an opposite end passing through the bracket to connect with the antenna unit.

Other objects, advantages and novel features of the invention will become more apparent from the following detailed description when taken in conjunction with the accompanying drawings.

DETAILED DESCRIPTION OF THE INVENTION

Figure 1:
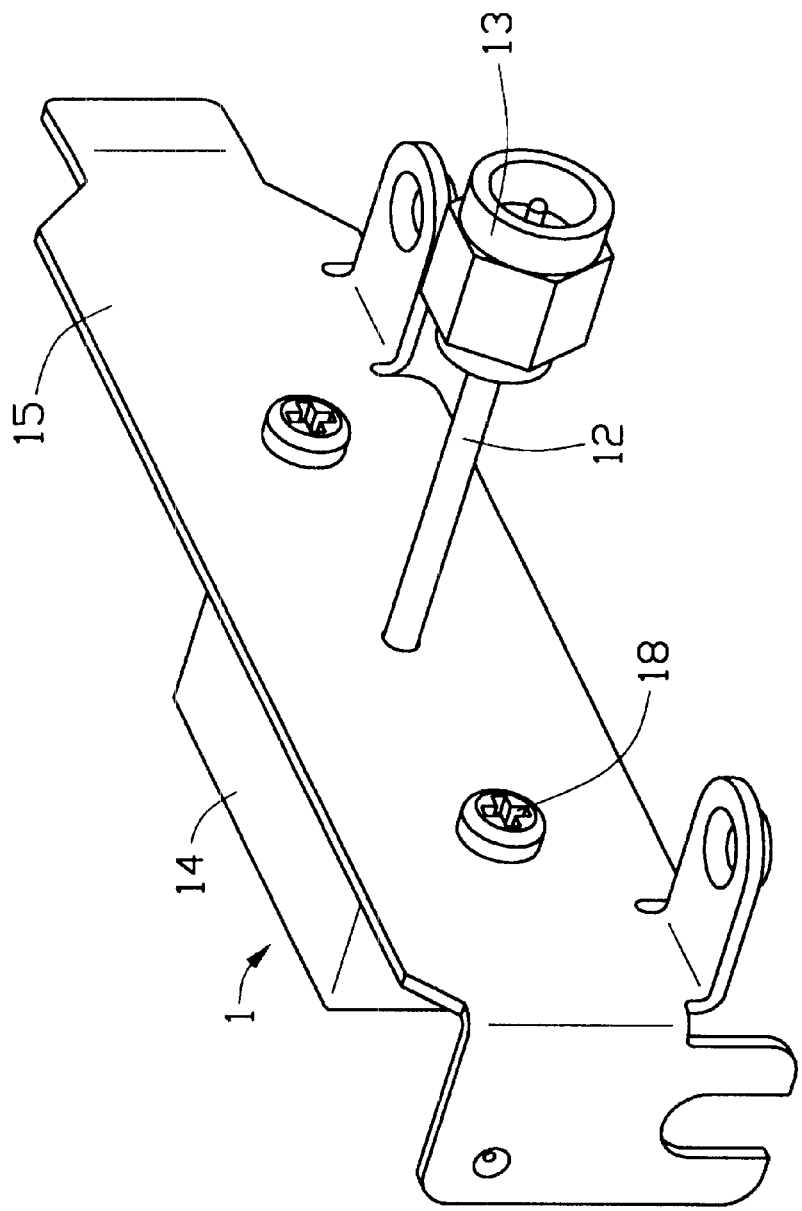
FIG. 1 shows a perspective view of an antenna assembly in accordance with an exemplar embodiment of the present invention.

Reference will now be made to the drawing figures to describe the present invention in detail.

Figure 2:
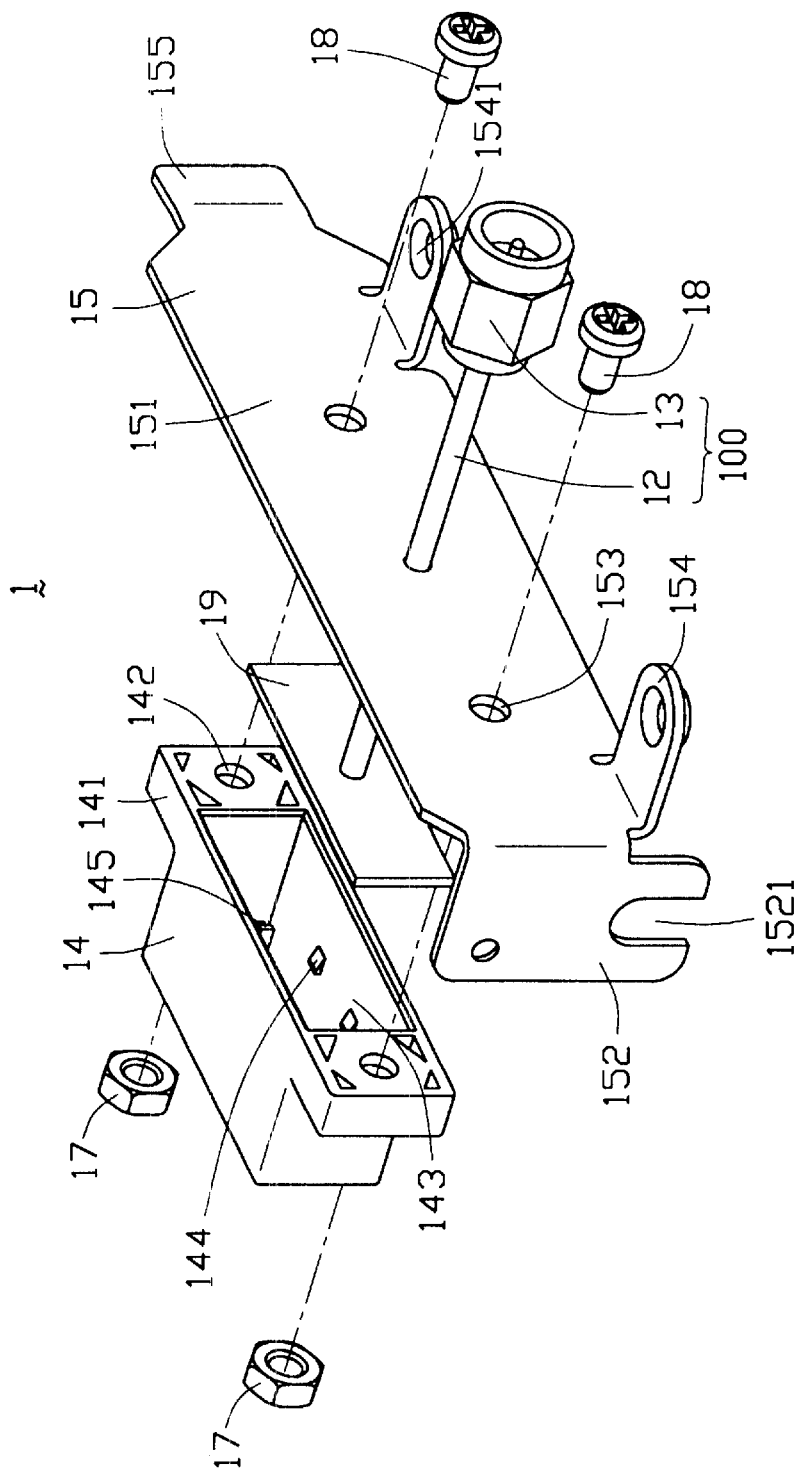
FIG. 2 shows an exploded view of the antenna assembly of FIG. 1.
Figure 3:
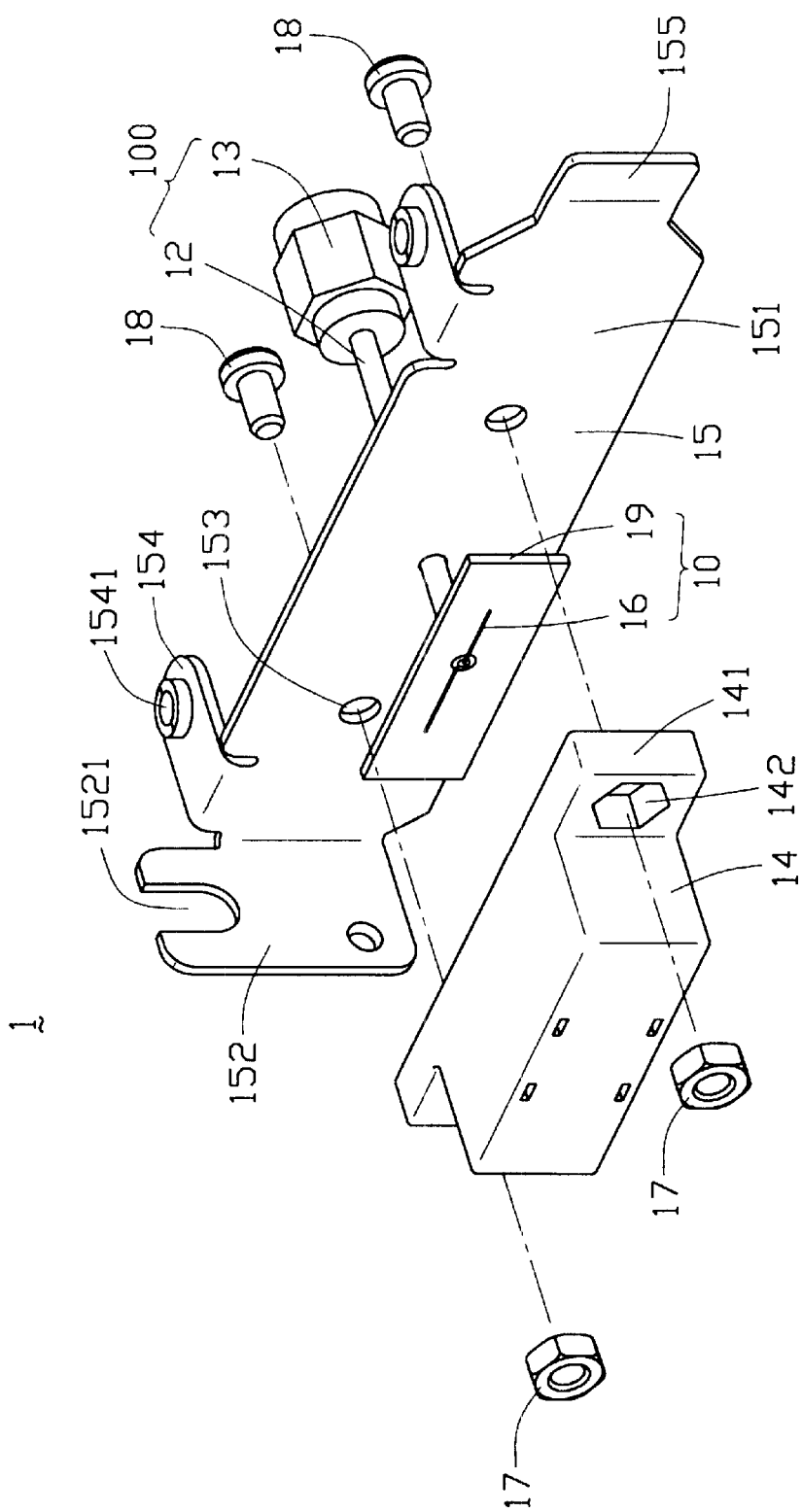
FIG. 3 shows the antenna assembly of FIG. 2 in another exploded view.

Referring to FIGS. 1 to 3, an antenna assembly 1 in accordance with the present invention comprises a bracket 15, an antenna unit 10, an housing 14 and a connector unit 100.

Particularly referring to FIGS. 2 and 3, the antenna unit 10 includes a substrate 19 and an antenna body 16. The substrate 19 is a rectangular insulative board. The antenna body 16 is mounted on a front surface of the substrate 19.

The connector unit 100 comprises a cable 12 and a connector 13. The cable 12 connects the antenna body 16 with the connector 13 through the bracket 15. The cable 12 is a coaxial cable and serves as RF feeder of the antenna body 16. The connector 13 provides an electrical interface to an RF circuitry (not shown).

The housing 14 is a hollow insulative cuboid, with a cuboid cavity 143 opened to backward and two locating wings 141 respectively protruding horizontally from opposite sides thereof. A first hole 142 is defined through each locating wing 141. A plurality of wedge shaped hooks 144 are formed on an inner sidewall of the cavity 143, with bevel surface of the hooks 144 facing rearward. Four posts 145 are formed respectively at four inner corners of the cavity 143.

The bracket 15 is made of a sheet metal and provides a bracket body 151, a locating tab 152, a rectangular tab 155, two second mounting holes 153 and two holding tabs 154. The locating tab 152 bends forwardly from one end of the bracket body 151 and perpendicular to the bracket body 151. The rectangular tab 155 extends from an opposite end of the bracket body 151 and slightly bends forwardly. The two holding tabs 154 bend rearwardly from a lower edge of the bracket body 151 and perpendicular to the bracket body 151, and near two ends of the bracket body 151 respectively. A U-shaped notch 1521 is formed in the locating tab 152 for matching with an inserted screw nut (not shown). The two second mounting holes 153 are defined in the bracket body 151, respectively aligned with the first holes 142 in the locating wings 141 of the housing 14. A screw hole 1541 is defined in each holding tab 154 for holding other elements, such as a printed circuit board (PCB) (not shown).

Figure 4:
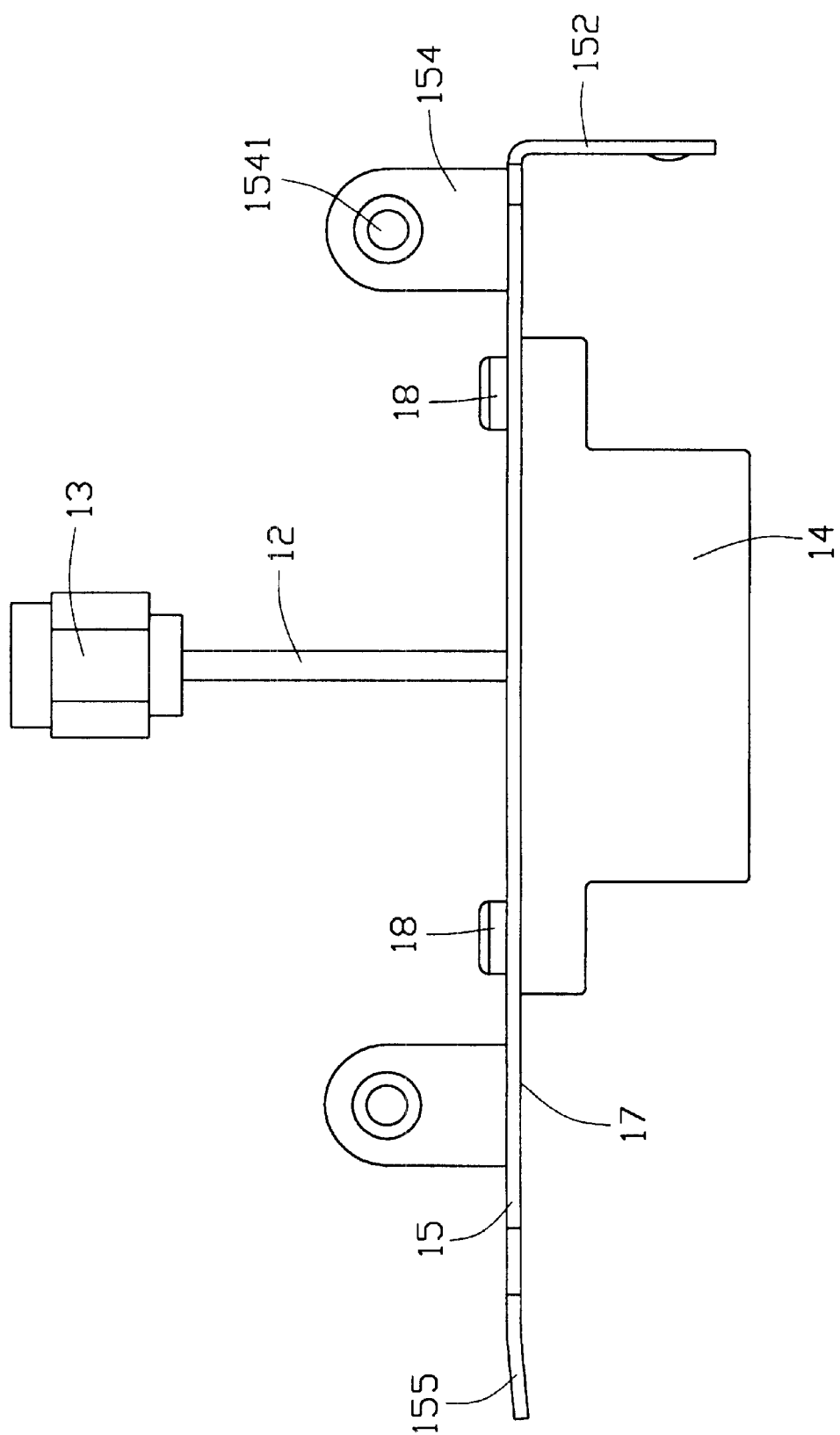
FIG. 4 shows a top view of the antenna assembly of FIG. 1.

Particularly referring to FIG. 1 and 4, the substrate 19 is assembled in the cavity 143 of the housing 14 by engaging the substrate 19 between the posts 145 and the hooks 144. The substrate 19 is received in the housing 14 and positioned parallel to the bracket 15. The housing 14 is attached to the front surface of the bracket 15, with the first holes 142 aligned with the second holes 153 respectively. A screw 18 and a nut 17 engage each other through each first hole 142 of the housing 14 and each second hole 153 of the bracket 15, in order to attach the housing 14 to the bracket 15.

Figure 5:
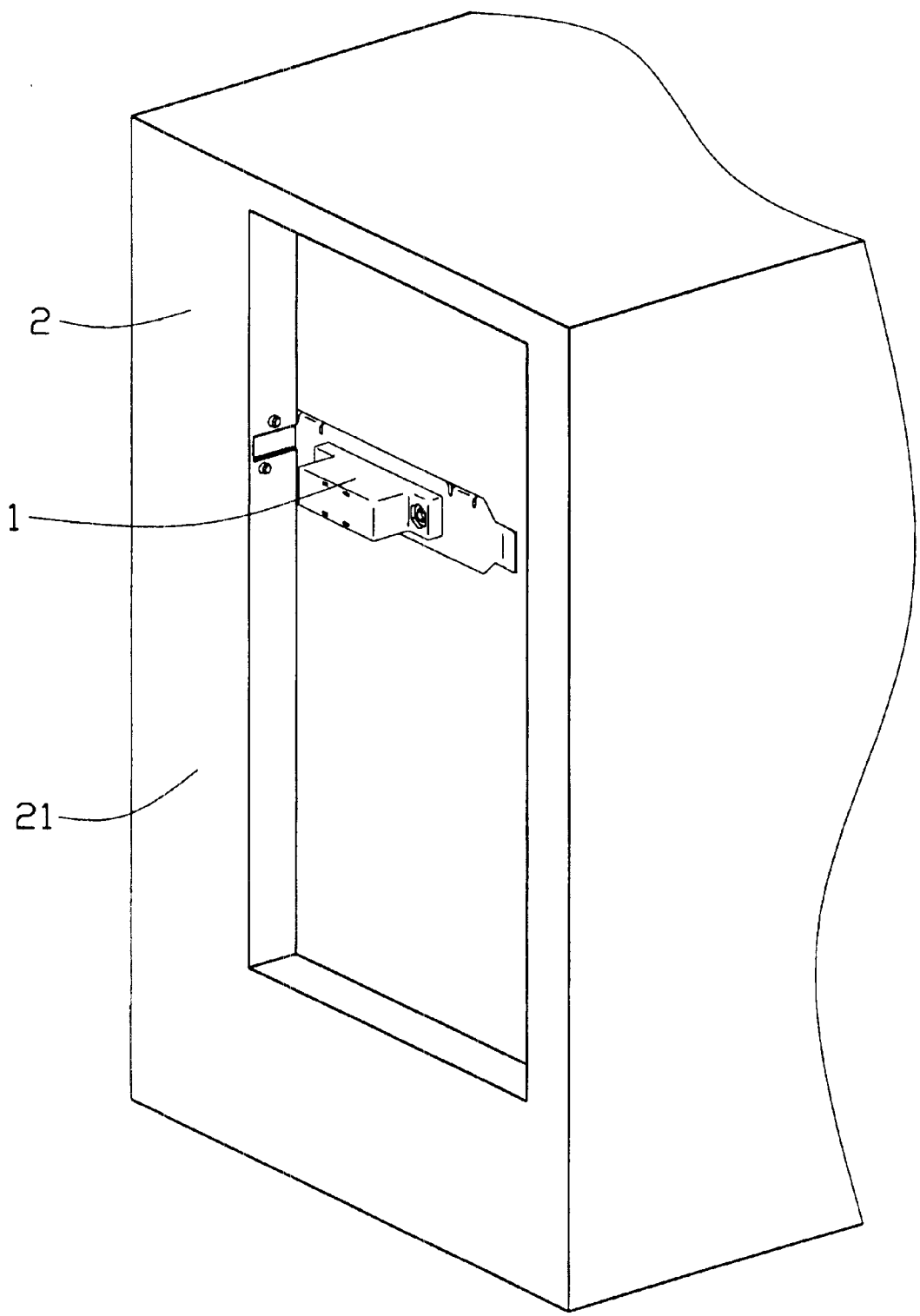
FIG. 5 shows an antenna assembly of the present invention assembled in a desktop computer.

In assembly, referring to FIG. 5, the antenna assembly 1 is mounted in an expansion slot (not labeled) in an enclosure 21 of the desktop computer 2 by fixing the bracket 15 to the enclosure 21. The housing 14 and the front surface of the bracket 15 expose to outside of the enclosure 21, so the communication of the antenna body 16 is not affected by the enclosure 21.

In this embodiment, the antenna body 16 is protected by the insulative housing 14 out of the enclosure 21 of the desktop computer 2, thereby assuring normal performance of the antenna body 16 and preventing the antenna body 16 from outer physical damage. And with the structure of this present invention, the antenna assembly 1 can be assembled in or disassembled from the desktop computer 2 easily.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An antenna assembly mounted in an expansion slot of a computer enclosure, comprising:

a bracket mounted in the expansion slot of the computer enclosure and covering the expansion slot;

an antenna unit including a substrate and an antenna body attached on the substrate;

an insulative housing attached to an exterior surface of said bracket and receiving said antenna unit therein;

a connector unit including a cable and a connector connected to an end of the cable, the cable having an opposite end passing through the bracket to connect with said antenna unit.

2. The antenna assembly as claimed in claim 1, wherein the cable is a coaxial cable and serves as a feeder line of the antenna body.

3. The antenna assembly as claimed in claim 1, wherein the housing defines a cavity, a plurality of hooks formed on two opposite inner sidewalls thereof, and four posts formed at four inner coners of the cavity respectively; and wherein the antenna body is disposed on a front surface of the substrate, and the antenna unit is received in the cavity of the housing by engaging the substrate between the posts and the hooks.

4. The antenna assembly as claimed in claim 1, wherein two first holes are defined in the housing and two second holes are defined in the bracket and aligned with the first holes for extention of a fastener therethrough.

5. A computer enclosure system comprising:

a metal enclosure defining therethrough an expansion slot communicating both exterior and interior sides thereof;

a bracket mounted to the enclosure and covering said expansion slot;

an antenna unit positioned by said bracket and on said exterior side of the enclosure;

a housing at least partially covering said antenna unit; and a connector positioned on the interior side of the enclosure and electrically connected to said antenna unit.

6. The system as claimed in claim 5, wherein a cable is mechanically connected between said connector and said antenna unit.

7. The system as claimed in claim 5, wherein said housing defines a cavity to receive a substrate of said antenna unit therein.

8. The system as claimed in claim 5, wherein said housing is secured to the bracket.

9. The system as claimed in claim 5, wherein said housing is insulative.

10. A method of emitting/receiving signals in an enclosure system, comprising steps of:

providing a metal enclosure with at least an expansion slot;

covering said expansion slot with a bracket;

positioning an antenna unit on an exterior side of said enclosure beside said bracket;

covering said antenna unit with a housing; and providing a cable extending through said bracket to electrically connect said antenna unit to an electronic component within an interior side of said enclosure.

11. The method as claimed in claim 10, wherein said housing is secured to said bracket.

12. The method as claimed in claim 10, wherein said component is a connector.

13. The method as claimed in claim 10, wherein said housing is insulative.

* * * * *